United States Patent [19]
Jago et al.

[11] Patent Number: 6,126,599
[45] Date of Patent: Oct. 3, 2000

[54] ULTRASONIC DIAGNOSTIC IMAGING SYSTEM WITH REAL TIME SPATIAL COMPOUNDING PROCESSOR

[75] Inventors: James R. Jago, Seattle; Robert H. Pedersen, Woodinville, both of Wash.

[73] Assignee: ATL Ultrasound, Inc., Bothell, Wash.

[21] Appl. No.: 09/335,159

[22] Filed: Jun. 17, 1999

Related U.S. Application Data

[60] Provisional application No. 60/102,923, Oct. 1, 1998.

[51] Int. Cl.[7] ........................................... A61B 8/00
[52] U.S. Cl. ............................................ 600/437; 600/443
[58] Field of Search ..................... 600/443, 437, 600/447, 444, 454–456; 73/625–626

[56] References Cited

U.S. PATENT DOCUMENTS

| | | |
|---|---|---|
| 4,070,905 | 1/1978 | Kossoff . |
| 4,233,988 | 11/1980 | Dick et al. . |
| 4,649,327 | 3/1987 | Fehr et al. .............................. 600/443 |
| 5,453,575 | 9/1995 | Haviland . |
| 5,479,926 | 1/1996 | Ustuner et al. . |
| 5,538,004 | 7/1996 | Bamber .................................. 600/443 |
| 5,566,674 | 10/1996 | Weng . |
| 5,782,766 | 7/1998 | Weng et al. ............................. 600/443 |
| 5,885,218 | 3/1999 | Teo et al. ................................ 600/443 |

FOREIGN PATENT DOCUMENTS

| | | |
|---|---|---|
| 83 00993 | 3/1983 | WIPO . |
| 98 24065 | 6/1998 | WIPO . |

*Primary Examiner*—Marvin M. Lateef
*Assistant Examiner*—Maulin Patel
*Attorney, Agent, or Firm*—W. Brinton Yorks, Jr.

[57] ABSTRACT

An ultrasonic diagnostic imaging system produces spatially compounded images by combining component frames acquired from different look directions. In a first embodiment, the oldest component frame used to form a spatially compounded image is subtracted from the spatially compounded image to produce a partially summed image, and a newly acquired frame is added to the partially summed image to form a new spatially compounded image. In a second embodiment, different groups of component frames are concurrently summed to form multiple spatially compounded images simultaneously. The display alternates between the display of the simultaneously produced spatially compounded images.

30 Claims, 4 Drawing Sheets

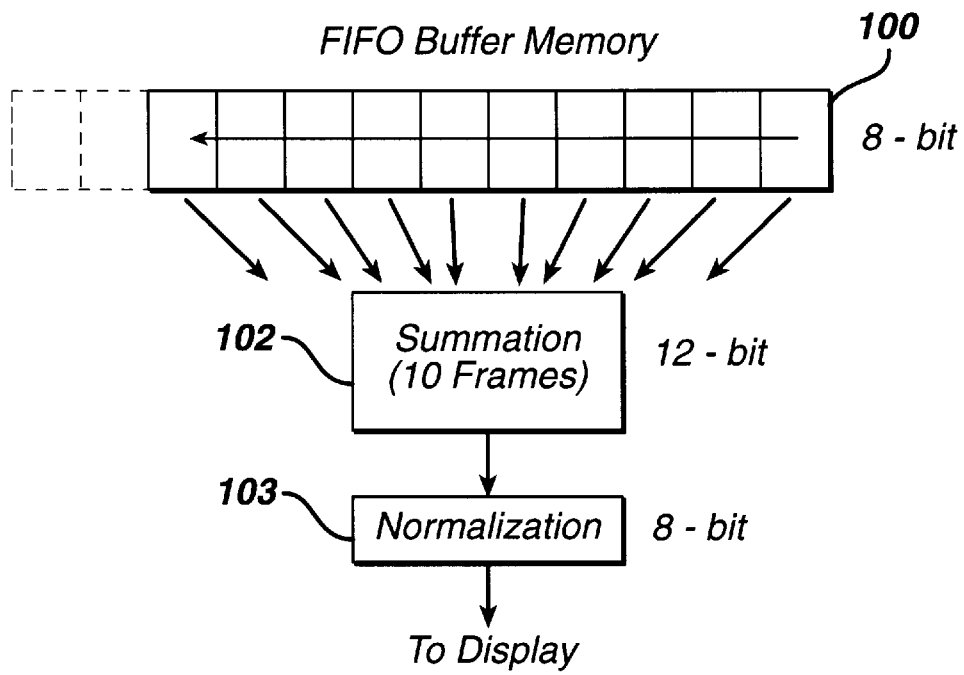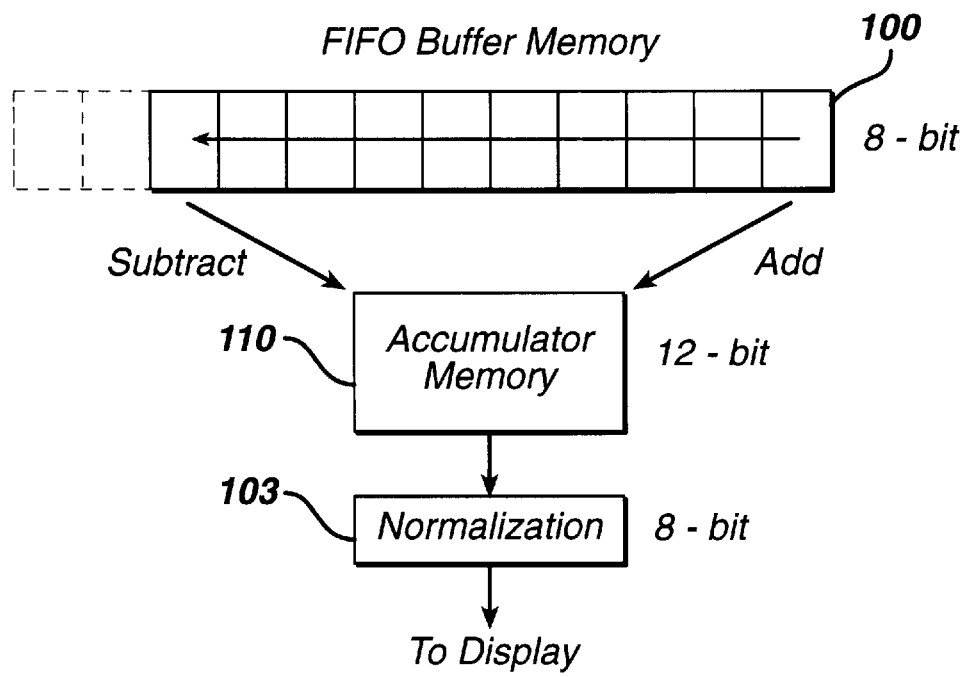

ULTRASONIC DIAGNOSTIC IMAGING SYSTEM WITH REAL TIME SPATIAL COMPOUNDING PROCESSOR

This application claims the benefit of Provisional U.S. Patent Application serial No. 60/102,923, filed Oct. 1, 1998.

This invention relates to ultrasonic diagnostic imaging systems and, in particular, to ultrasonic diagnostic imaging systems with efficient processors for producing spatially compounded images.

Spatial compounding is an imaging technique in which a number of ultrasound images of a given target that have been obtained from multiple vantage points or angles are combined into a single compounded image by combining the data received from each point in the compound image target which has been received from each angle. Examples of spatial compounding may be found in U.S. Pat. Nos. 4,649,927; 4,319,489; and 4,159,462. Real time spatial compound imaging is performed by rapidly acquiring a series of partially overlapping component image frames from substantially independent spatial directions, utilizing an array transducer to implement electronic beam steering and/or electronic translation of the component frames. The component frames are combined into a compound image by summation, averaging, peak detection, or other combinational means. The acquisition sequence and formation of compound images are repeated continuously at a rate limited by the acquisition frame rate, that is, the time required to acquire the full complement of scanlines over the selected width and depth of imaging.

The compounded image typically shows lower speckle and better specular reflector delineation than conventional ultrasound images from a single viewpoint. Speckle is reduced (i.e. speckle signal to noise ratio is improved) by the square root of N in a compound image with N component frames, provided that the component frames used to create the compound image are substantially independent and are averaged. Several criteria can be used to determine the degree of independence of the component frames (see, e.g., O'Donnell et al. in IEEE Trans. UFFC v.35, no.4, pp 470–76 (1988)). In practice, for spatial compound imaging with a steered linear array, this implies a minimum steering angle between component frames. This minimum angle is typically on the order of several degrees.

The second way that spatial compound scanning improves image quality is by improving the acquisition of specular interfaces. For example, a curved bonesoft tissue interface produces a strong echo when the ultrasound beam is exactly perpendicular to the interface, and a very weak echo when the beam is only a few degrees off perpendicular. These interfaces are often curved, and with conventional scanning only a small portion of the interface is visible. Spatial compound scanning acquires views of the interface from many different angles, making the curved interface visible and continuous over a larger field of view. Greater angular diversity generally improves the continuity of specular targets. However, the angular diversity available is limited by the acceptance angle of the transducer array elements. The acceptance angle depends on the transducer array element pitch, frequency, and construction methods.

One of the problems associated with real time spatial compound imaging is that multiple component images must be processed and compounded at rates which afford the production of compound images at a real time frame rate. When N component frames are to be combined to form a compound image, the compound image processor must be able to access all N frames, and to sum and normalize the image data of all of the frames. If each image, for instance, is 512 pixels wide by 512 pixels high and each pixel is an eight bit byte of data, it will be appreciated that the processing data rate (bandwidth) must be very high in order to process this amount of data into one compound image frame. Consequently it is desirable to have a compound image processor which performs real time spatial compounding with reduced bandwidth demands.

In accordance with the principles of the present invention, a compound image processor is provided with one or more image accumulators for combining component frames to form a spatially compounded image. In a first embodiment an accumulator operates using partially summed images, obviating the need to combine the full complement of N component frames to produce each compound image. As a new component frame is acquired, the oldest component frame is subtracted from the compound image stored in the accumulator and the new component frame is added to the N−1 image combination thereby produced. The compound image processor can thus generate a new compounded image whenever a new component frame is acquired. In a second embodiment multiple accumulators are used to form multiple compound images simultaneously, with completed images being produced alternately from different ones of the accumulators. Thus, as one accumulator begins to form a compound image, another accumulator is completing the formation of a compound image, and the frame rate of display is the sum of the image production rates of the multiple accumulators. A combination of the techniques of both embodiments may be combined in a constructed embodiment of the present invention.

In the drawings:

FIG. 3 illustrates in block diagram form a conventional spatial compounding processor with frame memories and compound image accumulator;

FIG. 4 illustrates in block diagram form a first embodiment of the present invention using an accumulator which operates upon partially summed compound images.

Figure 1:
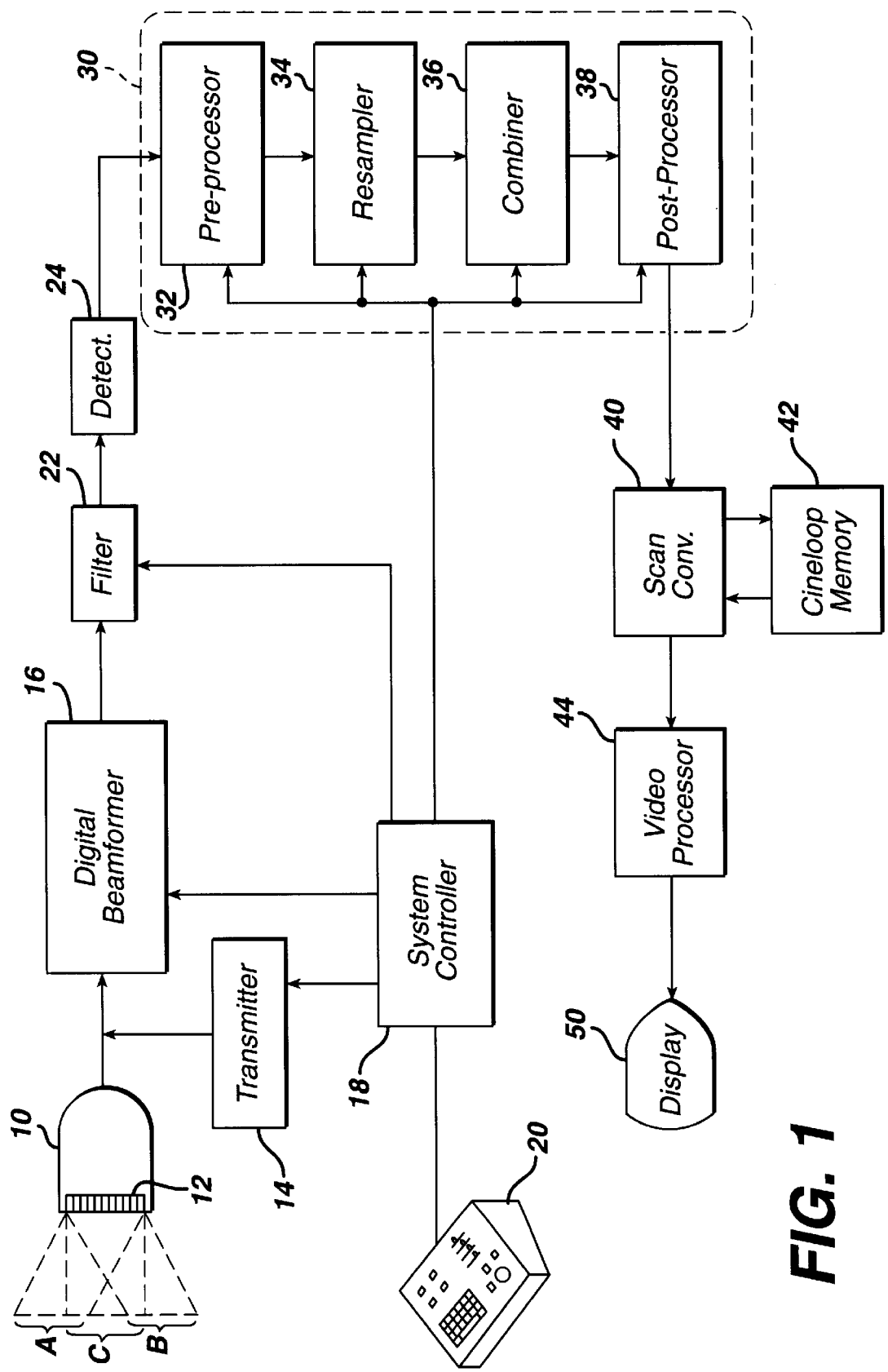
FIG. 1 illustrates in block diagram form an ultrasonic diagnostic imaging system constructed in accordance with the principles of the present invention.

Referring first to FIG. 1, an ultrasonic diagnostic imaging system constructed in accordance with the principles of the present invention is shown. A scanhead 10 including an array transducer 12 transmits beams at different angles over an image field denoted by the dashed rectangle and parallelograms. Three groups of scanlines are indicated in the drawing, labeled A, B, and C with each group being steered at a different angle relative to the scanhead. The transmission of the beams is controlled by a transmitter 14 which controls the phasing and time of actuation of each of the elements of the array transducer so as to transmit each beam from a predetermined origin along the array and at a predetermined angle. The echoes returned from along each scanline are received by the elements of the array, digitized as by analog to digital conversion, and coupled to a digital beamformer 16. The digital beamformer delays and sums the echoes from the array elements to form a sequence of focused, coherent digital echo samples along each scanline. The transmitter 14 and beamforner 16 are operated under control of a system controller 18, which in turn is responsive to the settings of controls on a user interface 20 operated by the user of the ultrasound system. The system controller controls the transmitter to transmit the desired number of scanline groups at the desired angles, transmit energies and frequencies. The system controller also controls the digital beamformer to properly delay and combine the received echo signals for the apertures and image depths used.

The scanline echo signals are filtered by a programmable digital filter 22, which defines the band of frequencies of interest. When imaging harmonic contrast agents or performing tissue harmonic imaging the passband of the filter 22 is set to pass harmonics of the transmit band. The filtered signals are then detected by a detector 24. In a preferred embodiment the filter and detector include multiple filters and detectors so that the received signals may be separated into multiple passbands, individually detected and recombined to reduce image speckle by frequency compounding. For B mode imaging the detector 24 will perform amplitude detection of the echo signal envelope. For Doppler imaging ensembles of echoes are assembled for each point in the image and are Doppler processed to estimate the Doppler shift or Doppler power intensity.

In accordance with the principles of the present invention the digital echo signals are processed by spatial compounding in a processor 30. The digital echo signals are initially pre-processed by a preprocessor 32. The pre-processor 32 can preweight the signal samples if desired with a weighting factor. The samples can be preweighted with a weighting factor that is a function of the number of component frames used to form a particular compound image. The pre-processor can also weight edge lines that are at the edge of one overlapping image so as to smooth the transitions where the number of samples or images which are compounded changes. The pre-processed signal samples may then undergo a resampling in a resampler 34. The resampler 34 can spatially realign the estimates of one component frame or to the pixels of the display space.

After resampling the image frames are compounded by a combiner 36. Combining may comprise summation, averaging, peak detection, or other combinational means. The samples being combined may also be weighted prior to combining in this step of the process. Finally, post-processing is performed by a post-processor 38. The post-processor normalizes the combined values to a display range of values. Post-processing can be most easily implemented by look-up tables and can simultaneously perform compression and mapping of the range of compounded values to a range of values suitable for display of the compounded image.

The compounding process may be performed in estimate data space or in display pixel space. In a preferred embodiment scan conversion is done following the compounding process by a scan converter 40. The compound images may be stored in a Cineloop® memory 42 in either estimate or display pixel form. If stored in estimate form the images may be scan converted when replayed from the Cineloop memory for display. The scan converter and Cineloop memory may also be used to render three dimensional presentations of the spatially compounded images as described in U.S. Pat. Nos. 5,485,842 and 5,860,924. Following scan conversion the spatially compounded images are processed for display by a video processor 44 and displayed on an image display 50.

The embodiment of FIG. 1 is seen to perform two processes which reduce image speckle, a degrading characteristic of ultrasound and other imaging processes using coherent signals. Both frequency compounding and spatial compounding are employed in the illustrated embodiment to reduce speckle. Neither process can completely remove the speckle artifact, but can only reduce it by the compounding of data with differing speckle characteristics, a reduction of the artifact by a factor of approximately the square root of two. However, the use of these two speckle reduction effects is especially effective, since the improvement will be multiply compounded. Frequency compounding and spatial compounding are also especially effective when employed in tandem because both processes operate on the data from only a single signal or pixel. In frequency compounding the frequencies of one signal or pixel are split, separately detected and the separately detected signals, each with a different speckle characteristic, are recombined. In spatial compounding in accordance with the present invention a single pixel or image point is interrogated or sampled from a different "look direction," each with a different speckle characteristic, and combined. In both cases only a single pixel or image point is used, unlike other speckle reduction techniques which degrade resolution by combining adjacent image data.

Figure 2:
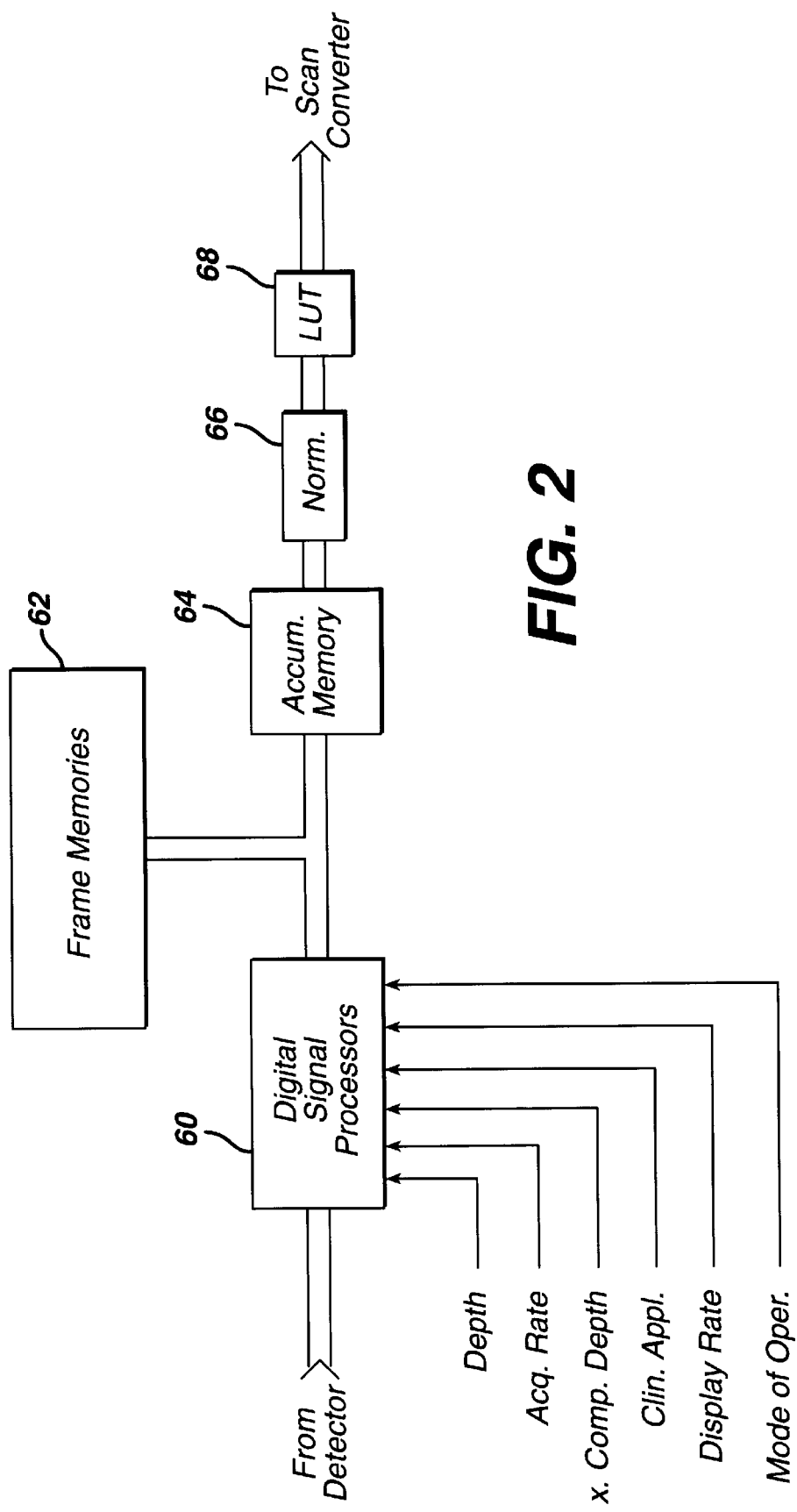
FIG. 2 illustrates in block diagram form a preferred implementation of the spatial compounding processor of FIG. 1.

FIG. 2 illustrates a preferred implementation of the spatial compounding processor 30 of FIG. 1. The processor 30 is preferably implemented by one or more digital signal processors 60 which process the image data in various ways. The digital signal processors 60 can weight the received image data and can resample the image data to spatially align pixels from frame to frame, for instance. The digital signal processors 60 direct the processed image frames to a plurality of frame memories 62 which buffer the individual image frames. The number of image frames capable of being stored by the frame memories 62 is preferably at least equal to the maximum number of image frames to be compounded such as sixteen frames. In accordance with the principles of the present invention, the digital signal processors are responsive to control parameters including image display depth, depth of region of greatest compounding, clinical application, compound display rate, mode of operation, and acquisition rate for determining the number of images to compound at a given instant in time. The digital signal processors select component frames stored in the frame memories 62 for assembly as a compound image in accumulator memory 64. The compounded image formed in the accumulator memory 64 is weighted or mapped by a normalization circuit 66, then compressed to the desired number of display bits and, if desired, remapped by a lookup table (LUT) 68. The fully processed compounded image is then transmitted to the scan converter for formatting and display.

Conventional approaches to implementing spatial compounding such as that shown in U.S. Pat. No. 4,649,927 typically use a large FIFO memory buffer 100 to temporarily store the component image frames that will be compounded (typically by averaging, i.e., summing 102 and normalization 103) to form the final compounded image, as shown in FIG. 3. For example, if the acquired images are 512 pixels× 512 pixels×1 byte and there are 10 images to be compounded, the buffer memory 100 would need to have a capacity of 2.5 megabytes. For real-time spatial compounding, where the compounded frames are generated either at the acquisition frame rate or at the display frame rate, the hardware that is performing the compounding must have sufficient bandwidth to access all of the frames in this buffer memory at the compounded frame rate, as well as have sufficient processing power to sum all of the frames and normalize the compounded frame at this rate. To proceed with the example above, if the required compounded frame rate is 60 Hz, the compound image processor would need a data bandwidth of at least 150 megabytes per second and would need to perform at least $150 \times 10^6$ sum/multiply operations per second.

In accordance with the principles of the present invention, a compound image processor is provided which considerably reduces the bandwidth and processing requirements imposed on the processor. A first embodiment of the present invention is obtained by considering the summation involved in averaging to be a linear and associative (FIR) filtering operation. In FIG. 4 an accumulator memory 110, which preferably has sufficient bit depth to preserve the full precision of the compounded image (e.g., 12 bits in this example), is initialized by summing the first N frames (where N is the number of component frames to be compounded). Subsequent compounded images are obtained by subtracting the oldest acquired frame (i.e. N−1 frames before the current frame, on the left of the FIFO in the drawing) from the summed framed in the accumulator memory 110 and adding the newest (most current) frame (on the right of the FIFO in the drawing) to the accumulator memory. The normalization 103 can be performed either on the input component frames before summation or on the summed image as it is read from the accumulator memory 110, prior to sending it on to other operations such as subsequent image processing or display.

In the example given above with 10 frames being compounded at a rate of 60 Hz, the data bandwidth required would be that needed to access the current frame and the oldest frame (i.e. N frames previous to the current frame) from the FIFO buffer memory 100, i.e., 30 megabytes per second, while the number of operations is that required to add and subtract these frames from the accumulator memory 110, i.e., approximately $30 \times 10^6$ operations per second. One of the advantages of this approach is that the bandwidth and processing requirements are independent of the number of component frames to be compounded—they depend only on the compounded frame rate. The extra memory required for the accumulator memory 110 would be 512×512×2 bytes, or 0.5 megabytes, which provides sufficient precision for up to 256 compounded frames.

One disadvantage of this approach is that the compounding operation is limited to operations that are linear and associative, such as addition and multiplication. Other operations, such as peak detection or median filtering, which do not follow linear combinatorial rules would not be possible with this embodiment. However, these operations would be possible with the conventional compounding approach described in FIG. 3.

A second embodiment of the present invention, which reduces still further the data bandwidth requirements, is possible if the output frame rate (i.e., the rate at which compounded images are generated) is substantially lower than the acquisition frame rate (i.e., the rate at which component images are acquired). This is a reasonable assumption when one considers that, if the compounded frames are generated at the acquisition rate, each compounded frame shares N−1 acquired frames in common with the previous compounded frame. In other words, there is typically a great deal of inherent persistence in real—time spatial compounding, the amount of persistence being directly proportional to the number of frames being compounded. Thus, to minimize the effects of motion induced blurring, it is desirable to maintain the highest possible acquisition rate. However, it may not be necessary to generate compounded images at the acquisition rate, bearing in mind the high temporal correlation between successive frames and the fact that the display rate may be lower than the acquisition rate.

Figure 5:
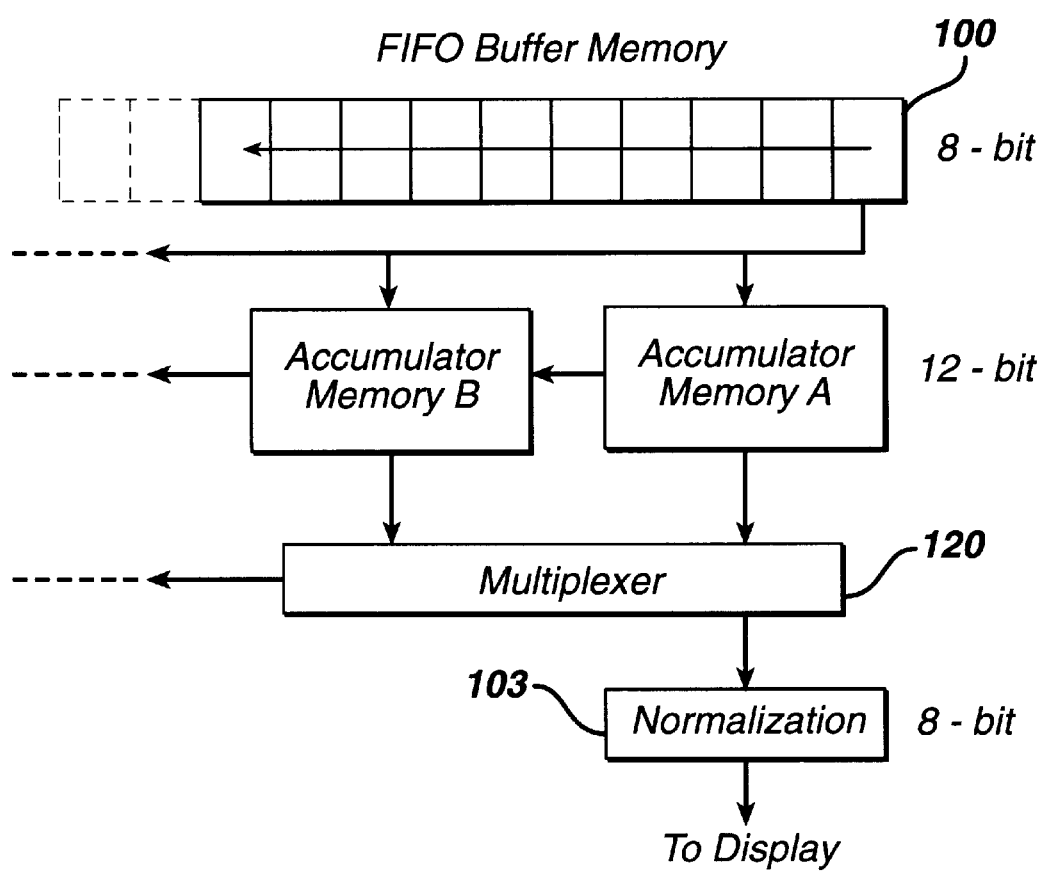
FIG. 5 illustrates in block diagram form a second embodiment of the present invention which uses multiple accumulators to simultaneously process multiple compound images.

FIG. 5 shows a second embodiment of the present invention using two (or more) accumulator memories A and B, where the output (display) frame rate is always a factor of CEIL(N/M) lower than the acquired frame rate, where N is again the number of component frames being compounded and M is the number of accumulators. The accumulator memories A and B are used to generate compounded images in a ping-pong fashion. For the case of two accumulators, memory A is initialized first by summing the first N frames, while memory B does not start accumulating until the (CEIL(N/2)+1) frame has been reached. Subsequently, each accumulator memory makes its compounded image available to a multiplexer 120 as soon as N consecutive frames have been summed. The accumulator memory is then immediately cleared before beginning a new accumulation of component frames. Since the accumulator memories are cleared for the averaging method of compounding, there is no need in this method to subtract the oldest acquired frames from the accumulated sum of frames in the memory—it is only necessary to add the newest frame to both accumulators. Furthermore, it is not necessary to have separate buffer memories for storage of the component frames, as there is no need to save component frames for subsequent subtraction. Thus, this embodiment can reduce the image buffer requirements of the ultrasound system. The multiplexer chooses the most recently accumulated compound image to be sent on for normalization 103 and display.

Using the previous example, an acquisition rate of 60 Hz with 10 compounded frames gives, with two accumulators, an output rate of 60/CEIL (10/2)=12 Hz. The data bandwidth needed to the FIFO is now only 15 megabytes per second, while the two accumulator memories require 1 megabyte (again using 16-bit precision) of memory and $30 \times 10^6$ operations per second, the same as the previous embodiment. Although the output of both accumulator memories must be normalized, this can now be done at the output rate of 12 Hz for a total of approximately $6 \times 10^6$ operations per second, thus representing overall a 500% reduction in normalization processing requirements compared to the first embodiment. Another advantage of this method is that the compounding operator need no longer be associative (it still needs to be linear), so that operations such as peak detection are now possible.

Like the first embodiment, the memory and processing requirements of this second embodiment are independent of the number of frames being compounded. However, higher output rates can be achieved by adding accumulators as indicated in FIG. 5 by the dashed lines, with a concurrent increase in processing requirements.

What is claimed is:

1. An ultrasonic diagnostic imaging system for producing spatially compounded images, including an array transducer which is operated to acquire component frames at a plurality of different look directions, and a compound image processor comprising:

a frame memory which temporarily stores a plurality of component frames;

an accumulator which stores combined component frames which form a spatially compounded image;

a subtractor which subtracts a stored component frame from a combination of component frames which includes said stored component frame to form a partially summed image; and an adder which adds a new component frame to said partially summed image.

2. The ultrasonic diagnostic imaging system of claim 1, wherein said subtractor comprises a processor which subtracts a frame which is N frames earlier where N frames are being compounded.

3. The ultrasonic diagnostic imaging system of claim 2, wherein said adder comprises a processor which adds a recently acquired component frame to said partially summed image.

4. The ultrasonic diagnostic imaging system of claim 1, wherein said subtractor and said adder comprise an accumulator memory.

5. The ultrasonic diagnostic imaging system of claim 1, further comprising a normalizer which normalizes the image produced by compounding.

6. An ultrasonic diagnostic imaging system for producing spatially compounded images, including an array transducer which is operated to acquire component frames at a plurality of different look directions, and a compound image processor comprising:
   a frame memory for temporarily storing a plurality of component frames;
   a first accumulator which combines a first group of component frames stored in said frame memory to form a first spatially compounded image;
   a second accumulator which combines a second group of component frames stored in said frame memory to form a second spatially compounded image; and
   a multiplexer, coupled to said first and second accumulators, for alternately selecting spatially compounded images from said first and second accumulators for display.

7. The ultrasonic diagnostic imaging system of claim 6, wherein said first and second accumulators are concurrently combining frames stored in said frame memory.

8. The ultrasonic diagnostic imaging system of claim 7, further comprising a controller, coupled to said accumulators, which clears an accumulator after a spatially compounded image of the accumulator is selected for display.

9. The ultrasonic diagnostic imaging system of claim 6, further comprising a normalizer which normalizes the images produced by said accumulators.

10. A method for operating an ultrasonic diagnostic imaging system to produce a spatially compounded image comprising the steps of:
    acquiring a sequence of component frames;
    combining a plurality of said component frames to produce a first spatially compounded image;
    subtracting one of said component frames used to produce said first spatially compounded image from said first spatially compounded image to produce a partially summed image; and
    adding a component frame which was not used to produce said first spatially compounded image to said partially summed image to produce a second spatially compounded image.

11. The method of claim 10, further comprising the step of normalizing said spatially compounded images.

12. A method for operating an ultrasonic diagnostic imaging system to produce a spatially compounded image comprising the steps of:
    acquiring a sequence of component frames;
    combining a first plurality of said component frames to produce a first spatially compounded image at a first point in time;
    at least partially simultaneously combining a second plurality of said component frames to produce a second spatially compounded image at a second point in time; and
    displaying said first and second spatially compounded images.

13. The method of claim 12, wherein said step of displaying comprises the step of alternately selecting said first and second spatially compounded images for display.

14. The method of claim 12, further comprising the step of normalizing said spatially compounded images.

15. The method of claim 12, wherein said step of combining comprises combining a first plurality of component frames in a first accumulator; said step of at least partially simultaneously combining comprises combining a second plurality of component frames in a second accumulator; and further comprising the steps of:
    alternately selecting spatially compounded images from said accumulators for display; and
    clearing each accumulator after its spatially compounded image is selected for display.

16. The method of claim 15, wherein at least some of said first plurality of component frames and said second plurality of component frames are the same.

17. A method of operating an ultrasonic diagnostic imaging system to produce realtime spatially compounded images comprising:
    acquiring a sequence of component frames by electronically steering beams to interrogate points in an image field from multiple different look directions, said component frames being acquired at an acquisition frame rate;
    combining ones of said component frames to produce spatially compounded images at a rate which is faster than the acquisition frame rate divided by the number of component frames used to form a spatially compounded image; and
    applying said spatially compounded images to a display device.

18. The method of claim 17, wherein said component frames are acquired at an acquisition frame rate of M frames per second, the number of component frames used to form a spatially compounded image is N frames, and said spatially compounded images are produced at a rate which is faster than (M/N) images per second.

19. The method of claim 17, further comprising using an acquired component frame to produce more than one spatially compounded image.

20. The method of claim 19, further comprising:
    forming partially completed spatially compounded images from one or more common component frames; and
    utilizing said partially completed spatially compounded images to form different completed spatially compounded images.

21. The method of claim 20, wherein said utilizing comprises combining a newly acquired component frame with a partially completed spatially compounded image to form a completed spatially compounded image.

22. The method of claim 20, wherein said forming partially completed spatially compounded images comprises subtracting a component frame from a combination of component frames.

23. The method of claim 22, wherein said combination of component frames comprises a completed spatially compounded image.

24. A method of operating an ultrasonic diagnostic imaging system to produce realtime spatially compounded images comprising:

acquiring a sequence of component frames by electronically steering beams to interrogate points in an image field from multiple different look directions;

combining ones of said component frames to produce spatially compounded images, at least two of said spatially compounded images comprising both component frames common to both of said spatially compounded images and component frames which are not common to both of said spatially compounded images; and applying said spatially compounded images to a display device.

25. The method of claim 24, further comprising:

forming partially completed spatially compounded images from one or more component frames; and utilizing said partially completed spatially compounded images to form different completed spatially compounded images.

26. The method of claim 25, wherein said utilizing comprises combining a newly acquired component frame with a partially completed spatially compounded image to form a completed spatially compounded image.

27. The method of claim 25, wherein said forming partially completed spatially compounded images comprises subtracting a component frame from a combination of component frames.

28. The method of claim 27, wherein said combination of component frames comprises a completed spatially compounded image.

29. The method of claim 24, wherein said at least two of said spatially compounded images are produced at different points in time.

30. The method of claim 24, wherein said at least two of said spatially compounded images are produced by combining component frames at least partially simultaneously in time.

* * * * *